United States Patent
Kargula et al.

(10) Patent No.: US 6,347,815 B1
(45) Date of Patent: Feb. 19, 2002

(54) QUICK CONNECT FLUID COUPLING WITH COMPONENTS POSITIONED TO PROVIDE CONTINUOUS INSERTION RESISTANCE

(75) Inventors: Christopher J. Kargula, Sterling Heights; Mark A. Bogucki, Warren; Steven T. Slunick, Waterford; William E. Stevens, Ypsilanti; Lakshmana S. Naraharisetti, Rochester Hills; Dennis G. Kinder, Clarkston, all of MI (US)

(73) Assignee: Cooper Technology Services, LLC, Findlay, OH (US)

( * ) Notice: Subject to any disclaimer, the term of this patent is extended or adjusted under 35 U.S.C. 154(b) by 0 days.

(21) Appl. No.: 08/522,017

(22) Filed: Aug. 31, 1995

(51) Int. Cl.[7] .................................. F16L 17/025
(52) U.S. Cl. ................. 285/345; 285/319; 285/342
(58) Field of Search ................ 285/319, 342, 285/921, 305, 308, 345

(56) References Cited

U.S. PATENT DOCUMENTS

| | | |
|---|---|---|
| 3,421,547 A | 1/1969 | Aslan |
| 3,489,172 A | 1/1970 | Whitmore |
| 3,894,556 A | 7/1975 | Pareja |
| 4,440,424 A | 4/1984 | Mode |
| 4,541,658 A | 9/1985 | Bartholomew |
| 4,756,558 A | 7/1988 | Beamer |
| 4,802,696 A | 2/1989 | Chohan et al. |
| 4,936,544 A | 6/1990 | Bartholomew |
| 5,054,743 A | 10/1991 | Norkey et al. |
| 5,065,790 A | 11/1991 | Kornas |
| 5,094,481 A * | 3/1992 | Takikawa .................. 285/319 |
| 5,107,890 A | 4/1992 | Gute |
| 5,161,833 A | 11/1992 | McNaughton et al. |
| 5,172,940 A * | 12/1992 | Usui et al. ............... 285/319 X |
| 5,232,273 A | 8/1993 | Eckstein et al. |
| 5,273,254 A | 12/1993 | McNaughton et al. |
| 5,277,402 A | 1/1994 | Szabo |
| 5,324,082 A | 6/1994 | McNaughton et al. |
| 5,338,002 A | 8/1994 | McNaughton et al. |
| 5,383,588 A * | 1/1995 | Berry ....................... 285/55 X |
| 5,413,387 A | 5/1995 | Bartholomew |
| 5,462,313 A * | 10/1995 | Rea et al. .................. 285/21.1 |
| 5,542,717 A * | 8/1996 | Rea et al. .................... 285/319 |

FOREIGN PATENT DOCUMENTS

GB          1067092        * 5/1967  ................. 285/397

* cited by examiner

Primary Examiner—H. Shackelford
(74) Attorney, Agent, or Firm—Carlson, Gaskey & Olds

(57) ABSTRACT

A quick connect coupling incorporates several improvements including the combination of several functions into a single component. A single stop member provides a structure for holding a check valve spring, and also provides a stop for the check valve. The single component further provides positioning for an o-ring. The coupling also includes a pilot which includes compressible ribs at its outer peripheral surface such that the pilot is self-centering preventing excessive off-centering of the tube. In addition, the position of an o-ring relative to a retainer is tightly controlled such that upon insertion of a tube into the connector, the tube will initially encounter a resistance force by compression of the seal. Once this resistance force is overcome, the tube will immediately begin to encounter a resistance force from the retainer. Thus, an installer does not see two separate resistance forces, but rather sees a continuous single resistance force. In this way, the installer is less likely to believe that a partially-connected tube is fully-connected.

5 Claims, 2 Drawing Sheets

QUICK CONNECT FLUID COUPLING WITH COMPONENTS POSITIONED TO PROVIDE CONTINUOUS INSERTION RESISTANCE

BACKGROUND OF THE INVENTION

This invention relates to an improvement in fluid quick connect couplings wherein the various components of the coupling are positioned with a greater degree of accuracy than in the prior art. Moreover, fewer components are required. With the inventive fluid coupling, the o-ring and retainer are positioned such that there will be only one continuous resistance to insertion of a tube.

Quick connect couplings are utilized in the prior art to connect fluid tubes to other fluid components, particularly on vehicles. As used in this application the term "tube" refers to any type of fluid carrying line.

Typically, a quick connect coupling includes a retainer with a plurality of resilient legs that flex outwardly to allow passage of an enlarged bead on the tube. The legs flex radially inwardly behind the bead, locking the tube in the component. Although this is the most common type of quick connect coupling, aspects of this inventive do have benefits in other types of couplings.

The use of quick connect couplings in a manufacturing process does present some challenges. In some cases, the assemblers have not fully connected the tube within the quick connect coupling. There is a required insertion force for moving the tube bead beyond the retainer legs to insure that the tube is fully connected by the quick connect coupling. If the quick connect coupling does not fully receive the tube (i.e., the bead does not move beyond the retainer legs), then fluid pressure on the tube, such as will occur during operation of the vehicle, can cause the tube to be blown outwardly of the coupling. This is, of course, undesirable.

Moreover, known quick connect couplings utilize a number of components that each have their own dimensional tolerances. By increasing the number of components, the number of dimensional tolerances, or total "stack up" of combined tolerances increases. This makes it difficult to reliably and accurately position the components relative to each other. To this end, it would be desirable to decrease the number of components in a fluid quick connect coupling.

Finally, standard quick connect couplings have a condition where their multiple components create excessive clearances that allow the tube to become off axis from the connector housing. This condition minimizes the effectiveness of the coupling seal. The prior art does not attempt to improve this problem.

SUMMARY OF THE INVENTION

In the disclosed invention, a fluid quick connect coupling reduces the number of components over the prior art. This reduces the number of individual dimensional tolerances and consequently the stack-up of dimensional tolerances. In this way, the relative positioning of the several components may be more tightly controlled. By being able to more tightly control the positioning of the components, one is able to achieve certain goals. In addition, by reducing the number of components, the cost and assembly time are also reduced.

One goal achieved by reducing the dimensional stack-up is that relative positioning of the o-ring and the retainer legs may be better optimized. The present invention also optimizes the relative position of the o-ring and the retainer. The o-ring seals the tube, and the retainer legs hold the tube. Both provide resistance to insertion of the tube. The seal resistance is due to compressing the seal. Typically, the seal resistance occurs, then there is a break in resistance, then the retainer leg resistance occurs. In the past, assemblers have sometimes interpreted the resistance force from the seal as being the retainer resistance force. Thus, once the seal resistance force has been overcome, the assembler has stopped further insertion. Such a tube is not fully connected.

The present invention positions the seal relative to the retainer leg such that there is no break between compression of the seal, and beginning to encounter the retainer leg resistance. Thus, an assembler is not given a "false feel" that by having overcome the seal insertion resistance, the assembler has fully connected the tube. Rather, there is one continuous resistance to insertion. In a preferred embodiment, the seal is positioned such that once seal resistance is overcome, the assembler immediately begins to encounter resistance from the retainer legs.

The use of the reduced number of components, provides valuable benefits in the positioning the o-ring relative to the retainer legs. The manufacturing tolerance stack-up makes it more difficult to accurately position an o-ring relative to the retainer. Thus, the two above-discussed portions of this invention benefit each other.

To achieve the component reduction, a single component is utilized to provide the three functions of an o-ring positioner, a spring holder for a check valve spring, and a stop to prevent undue movement of the check valve. The use of a single component to provide all three of these functions reduces the number of required components.

In other features of this invention, the valve seat has an optimized structure wherein there is a line contact that provides the valve seat, and the valve body is cut away at positions removed from the line contact at the valve seat.

In further features of this invention, a pilot member guides the tube into the housing. The pilot member is formed with compression ribs axially on its outer periphery. These ribs eliminate tolerance stack-up between the pilot and the housing. This is accomplished by the equally spaced ribs compressing evenly and centering the pilot. The compressed ribs tend to bias the pilot, and the evenly centered pilot positions the tube as if the pilot was one piece with the housing. This also benefits the optimization of component positioning.

The various combined features of this invention complement each other and result in a quick connect coupling which provides valuable benefits when compared to the prior art.

These and other features of the present invention can be best understood from the following specification and drawings, of which the following is a brief description.

DETAILED DESCRIPTION OF A PREFERRED EMBODIMENT

Figure 1:
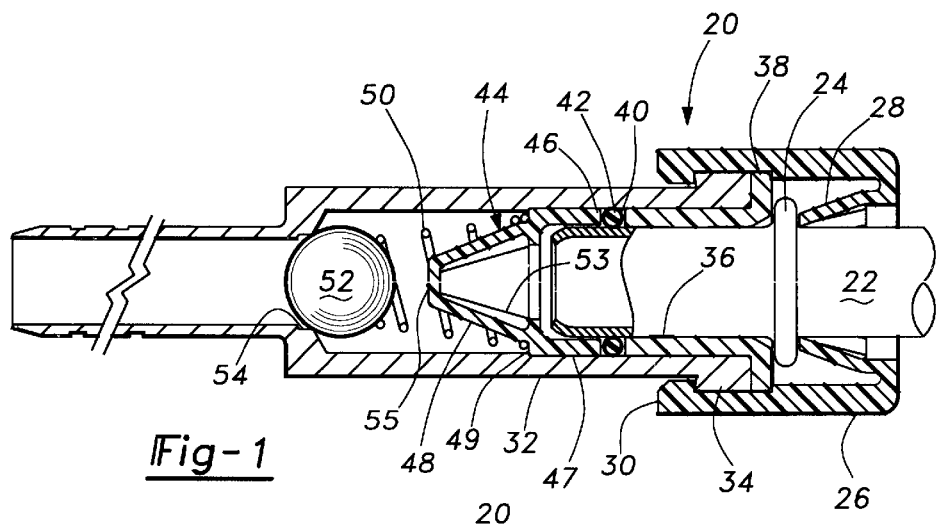
FIG. 1 is a cross-sectional view of an inventive quick connect coupling.

A quick connect coupling 20 is illustrated in FIG. 1. A tube 22 has a bead 24 which is held in place by a retainer 26. Retainer 26 is formed with a plurality of circumferentially-spaced resilient legs 28. Legs 28 flex radially outwardly when the tube 22 is inserted into the retainer 26. The legs allow passage of the bead 24. Once the bead 24 has moved axially inwardly beyond legs 28, the legs 28 snap back radially inwardly behind bead 24. The retainer 26 thus locks tube 22 in place in the coupling 20.

The retainer 26 is secured to a housing 32 by a plurality of fingers 30. The fingers 30 snap behind a circumferential ledge 34 on the housing 32. A pilot member 36 includes an end face 38 which guides the tube 22 into the bore of the housing 32. Also, an axially outer portion of the end face 38 preferably abuts ledge 34 and bead 24 when the tube 22 is fully assembled. Pilot member 36 has an inner end 40 which abuts one side of an o-ring 42. A one-piece stop 44 includes an outer end 46 which abuts the other side of o-ring 42.

One-piece stop 44 not only provides a stop for o-ring 26, it also provides a stop for a ball valve and holds a spring for the ball valve, as will now be explained. A frustro-conical portion 48 of stop 44 extends from a ledge 49. Ledge 49 extends radially outwardly to a cylindrical portion 47 that extends towards outer end 46. Ledge 49 mounts a spring 50 which biases a ball check valve 52 against a seat 54 in the housing 32, A ball stop 55 on stop 44 stops check valve 52 when it moves against the spring movement of force of spring 50 and away from seat 54. Passages 53 (one of which is shown) allow fluid to flow through stop 44. In the prior art, more than one piece was typically utilized to provide the function of a ball stop, a spring holder, and an o-ring positioner. The use of the one-piece stop 44 to provide all three of these functions reduces the number of components required for the coupling 20. As discussed above, this reduces the overall tolerance stack-up of coupling 20.

Figure 2A:
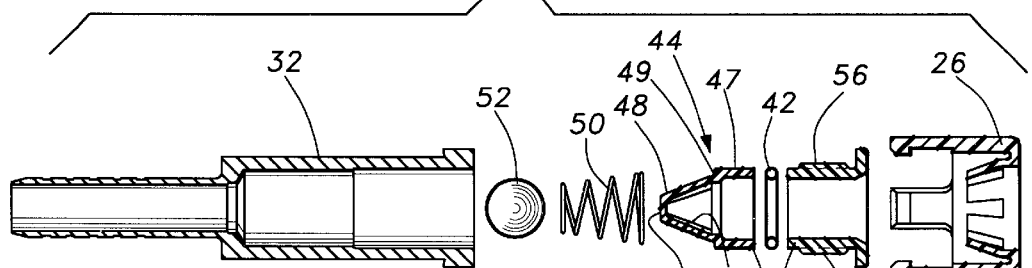
FIG. 2A is an exploded view of the inventive quick connect coupling.
Figure 2B:
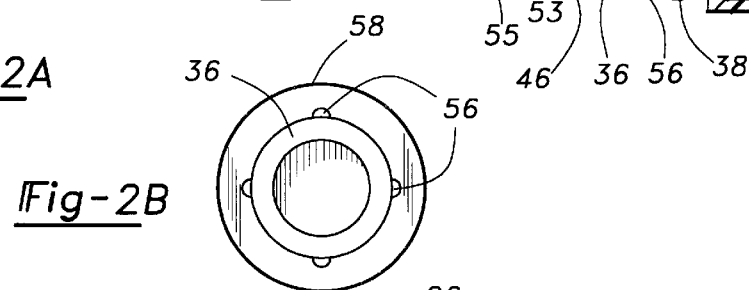
FIG. 2B shows a detail of the pilot member.

As shown in FIG. 2A, the housing 32 receives check valve 52, spring 50, stop 44, o-ring 42, pilot 36 and then the retainer 26. Pilot 36 is formed with a plurality of axial ribs 56. The ribs 56 are especially well shown in FIG. 2B. Ribs 56 are resiliently compressible, and perform a centering function as will be explained below. Ribs 56 are preferably formed as thin, out-jutting portions formed at equal circumferentially spaced locations on the outer periphery of the pilot 36. In one example, there might be four of the ribs 56 equal spaced about the outer periphery of the pilot 36. In one embodiment the ribs had a width of 1 mm, a height of 0.18 mm and a length of 5 mm for a coupling to receive a tube with a diameter of 9.5 mm.

Figure 3:
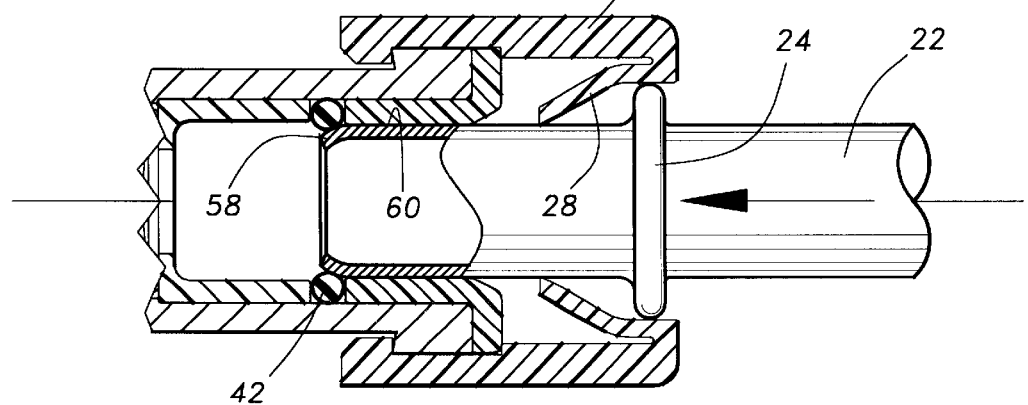
FIG. 3 is a cross-sectional view of the insertion of a tube into the inventive quick connect coupling.

As shown in FIG. 3, a feature of this invention includes an optimum positioning of the o-ring 42 relative to the retainer leg 28. This optimum positioning is made available in some respects because of the reduction in dimensional stack-up due to the one-piece stop 44, although it is not limited to a coupling with this reduction. In the inventive aspect shown in FIG. 3, the tube 22 is inserted, with bead 24 approaching legs 28. In the position shown in FIG. 3, a ramped smaller diameter portion 58 at the inner end of tube 22 is moving beyond the o-ring 42. As the tube moves along the o-ring from its smaller portion 58 towards its nominal outer diameter 60, the o-ring 42 is compressed. The compression of the o-ring 42 provides a resistance to insertion of the tube that an assembler must overcome. Generally, resistance to insertion is feedback to the assembler of when the tube is fully assembled. In the past, overcoming the resistance from compressing the o-ring has sometimes been interpreted by the assembler that the tube was fully received within the quick connect coupling. In the past, the assembler has thus sometimes stopped further insertion of the tube, and the tube was not fully connected.

Figure 4:
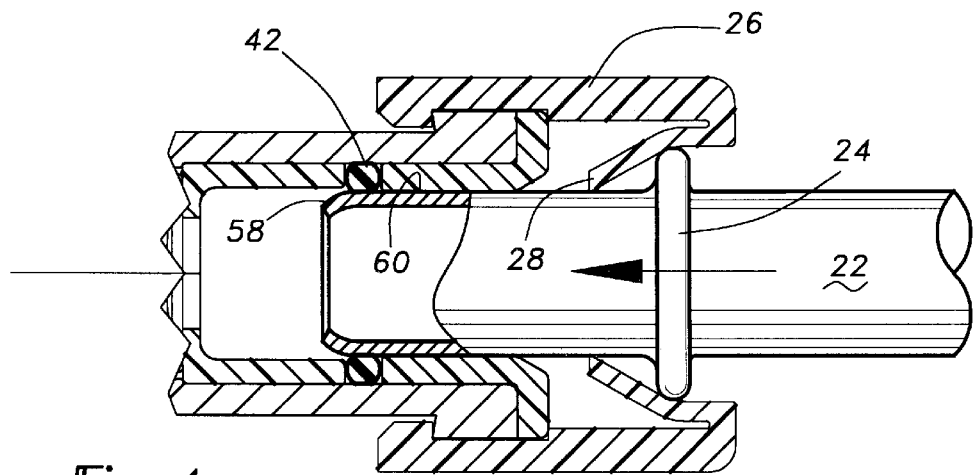
FIG. 4 shows a step just after the step shown in FIG. 3.

FIG. 4 shows a step in the connection of the tube 22 just after the position shown in FIG. 3. The smaller diameter portion 58 has now moved past the o-ring 42 and the outer peripheral portion 60 of the tube 22 has compressed the o-ring 42. The seal resistance has now been overcome. At this location, the bead 24 is already beginning to flex the legs 28 radially outwardly. Once the assembler overcomes the resistance to insertion due to the legs 28, the bead 24 will have moved beyond the legs and the legs can snap back behind the bead 24 to hold the tube 22 as shown in FIG. 1.

In the present invention, the o-ring 42 is positioned such that once the resistance due to compression of the o-ring 42 is overcome, the bead 28 will immediately begin to contact and flex legs 28 radially outwardly. The flexing of legs 28 radially outwardly provides a second resistance to insertion of the tube. The o-ring 42 and legs 28 are positioned such that there is one continuous resistance to insertion of the tube from the two components. There is no intermediate break. Thus, the assembler will not be provided with a false feedback that by having overcome the force of compressing the o-ring, the assembler has now fully assembled the connector. Rather, there is only one continuous resistance to insertion.

Figure 5:
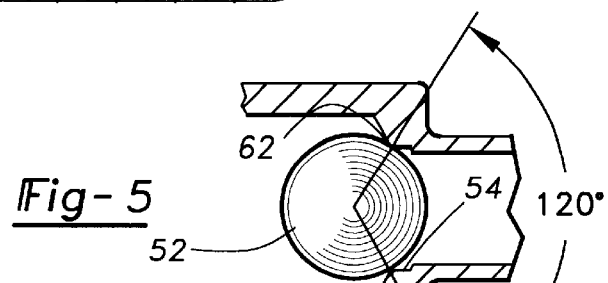
FIG. 5 shows a detail of the valve seat and valve body shown in FIG. 1.

FIG. 5 shows a detail of valve seat 54 in the housing 32. As shown, a single line contact 62 is formed about the ball 52. The line contact is set to be at an angle of approximately 120° relative to a central axis of the ball 52. The ball 52 is preferably formed of a Viton material. The improved ball and seat provide valuable benefits in achieving a fluid tight seal.

Figure 6:
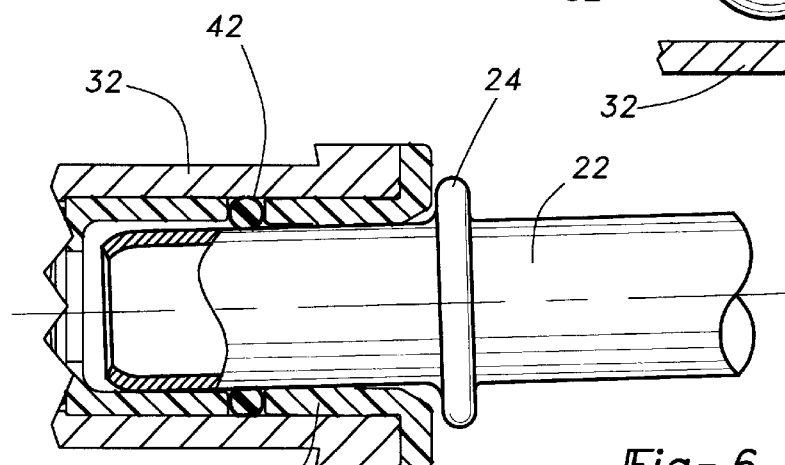
FIG. 6 shows a common problem with insertion of a tube into a quick connect coupling.
Figure 7:
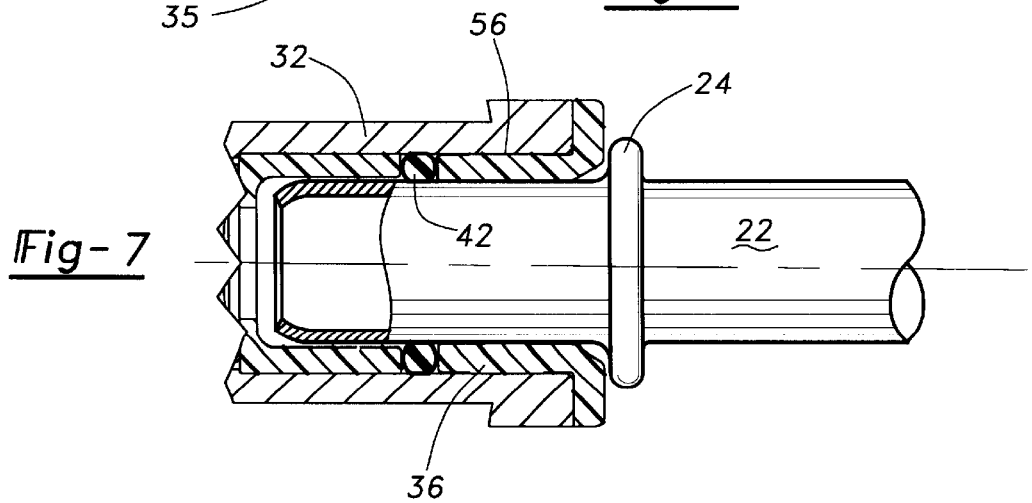
FIG. 7 shows a benefit of the present invention in correcting the problem illustrated in FIG. 6.

FIG. 6 shows one other feature of the present invention. As shown in FIG. 6. A pilot 35 without compression ribs 56 on pilot 36 as shown in FIG. 7 would allow tube 22 to become cocked due to opposing external side load forces applied to tube 22 and housing 32. This cocked condition minimizes the effectiveness of seal 42. Due to manufacturing processes, pilot 35 would have a clearance into housing 32 in the worst case stack-up condition. This clearance will allow the pilot to shift from the center axis of housing 32. The tube 22 can now cock for the amount of clearance between tube 22 and pilot 35 plus the clearance between pilot 35 and housing 32. Compression ribs 56 shown in FIG. 7 eliminates the clearance between pilot 36 and housing 32. Thus, the pilot maximizes the effectiveness of seal 42.

In summary, the present invention achieves several benefits and improvements over the prior art quick connect couplings. A worker of ordinary skill in the art would recognize that certain modifications would come within the scope of this invention. For that reason, the following claims should be studied to determine the true scope and content of this invention.

What is claimed is:

1. A method of providing a fluid coupling comprising the steps of:

1) providing a housing receiving a seal and also receiving a retainer, said seal being positioned relative to said retainer such that a resistance force to insertion of a fluid-handling member by compression of said seal occurring as a continuous force with a resistance force to insertion of the fluid-handling member by said retainer;

2) inserting a fluid-handling member into said housing such that said fluid-handling member begins to compress said seal, said fluid-handling member initially encountering a resistance to insertion from said seal, and said compression force resistance from said seal being overcome, and said fluid-handling member then immediately encountering resistance force from said retainer such that there is no break in resistance, and 3) continuing to insert said fluid-handling member until the resistance force from said retainer is overcome.

2. A fluid coupling comprising:

a housing extending along a central axis between an inner and an outer end;

a retainer positioned adjacent said outer end of said housing, said retainer being structured such that when a fluid-handling member is moved into said housing, said retainer provides a resistance to insertion of said fluid-handling member, and once said resistance force is overcome, portions of said retainer move to allow passage of the fluid-handling member, said retainer thereafter retaining said fluid-handling member in said housing;

said handling member received in said housing;

a seal for sealing an outer surface of said fluid-handling member after having been compressed by said fluid-handling member; and said seal being positioned relative to said retainer such that a resistance due to compression of said seal occurring as a continuous resistance force along with the resistance force from said retainer, said seal being positioned such that said fluid-handling member initially compresses said seal, and once said compression of said seal is complete an enlarged portion of said fluid handling member, then immediately begins to force said legs of said retainer radially outwardly such that there is no break in resistance.

3. A fluid coupling as recited in claim 2, wherein said retainer has a plurality of circumferentially-spaced resilient legs, and said fluid-handling member has an enlarged portion which forces said legs radially outwardly to allow passage of said enlarged portion, the radially outward movement of the legs creating the resistance force, said legs then snapping back radially inwardly to retain said fluid-handling member in said housing.

4. A fluid coupling as recited in claim 2, wherein said fluid-handling member has a smaller diameter axially inner end and a ramped portion leading to an outer peripheral greater diameter portion, said ramped portion compressing said seal, and once said ramp portion has moved beyond said seal such that said greater diameter portion is contacting said seal, said enlarged portion of said tube contacts said legs and begins to encounter said resistance to insertion.

5. A fluid coupling as recited in claim 2, wherein said seal is an o-ring.

* * * * *